Figure 1:
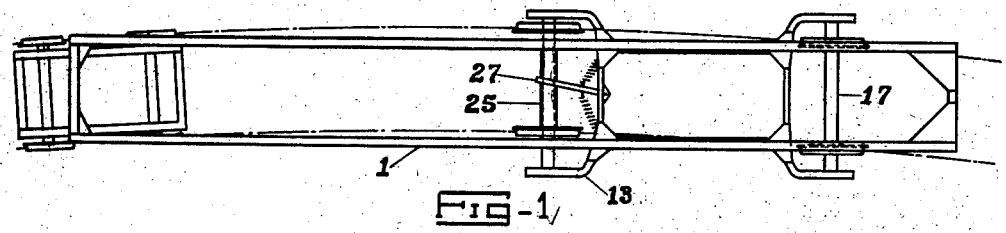

April 11, 1939.  A. C. SCHMOHL  2,154,139
CAR CONSTRUCTION
Original Filed Aug. 14, 1936  2 Sheets-Sheet 1

INVENTOR
Alfred C. Schmohl
BY
ATTORNEY

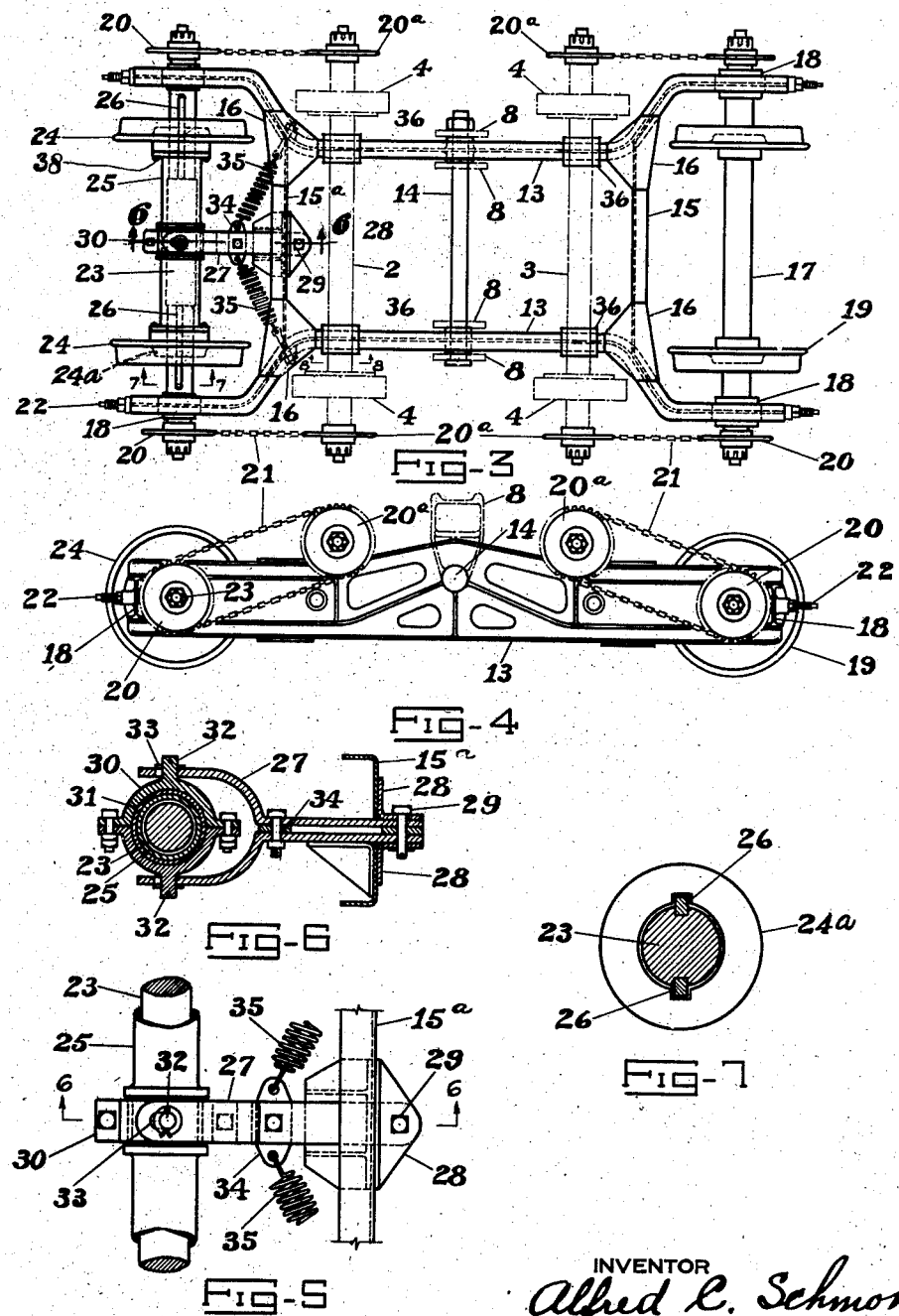

Patented Apr. 11, 1939

2,154,139

UNITED STATES PATENT OFFICE 2,154,139

CAR CONSTRUCTION

Alfred C. Schmohl, Beaver Falls, Pa., assignor, by mesne assignments, to Pressed Steel Car Company, Inc., Pittsburgh, Pa., a corporation of Pennsylvania Application August 14, 1936, Serial No. 96,003
Renewed August 13, 1938

9 Claims. (Cl. 105—159)

The invention pertains generally to car construction, and in particular to the conversion into a rail car of a motor truck chassis designed for operation on a highway. The motor truck chassis is of a standard design having a power plant at the front end, usually in the form of a gasoline motor, and provided with four driving wheels at the rear end, with one steering axle having a wheel at each end thereof at the front end of the chassis. These motor truck chassis are frequently converted into rail cars for use on narrow gauge tracks which frequently vary from a gauge of 30" upward in contrast to the usual 4' 8½" standard track gauge on American railways. The usual practice is to substitute a pivoting four-wheel truck disposed beneath the power plant at the front end of the chassis in place of the usual steering axle, and a four-wheel truck beneath the rear end of the chassis and connecting the driving axles to the axles of the truck to propel the rail car by means of the gasoline motor. These narrow gauge tracks frequently have curves built upon a very short radius, of 150 feet or less, and by reason of connecting the rear truck to the driving axles of the chassis, the rear truck cannot be pivotally connected to the chassis and some provision must be made for lateral movement of the rear end of the chassis whilst traversing these short radii curves of the track. In the past, different mechanisms have been provided to accommodate the necessary lateral movement of the rear end of the vehicle relative to the track in cases where a non-swiveling truck has been disposed beneath the rear end of the vehicle. In some cases the axle has been permitted to shift laterally of the truck but such a method is objectionable where the axles are driven as in the present invention. Another method has been to eliminate the flange on the wheels and provide a wide tread so that the tread of the wheel could slide laterally of the rail whilst traversing curves. Such a method is objectionable because of excess wear of the wheel tread and track, and in cases of curves having short radii, the width of flange required to provide the necessary lateral movement of the truck makes this method impractical and produces an unsightly wheel.

Another objectionable feature of the above described means for accommodating lateral movement between the vehicle and track was the lack of means for returning the vehicle to normal position whilst moving along the straight portions of the track. It is an object of the present invention to provide means for returning the wheels to a normal position whilst the vehicle is traversing straight portions of the track.

Another object of the invention is to provide a flanged wheeled rear truck for a vehicle of the character described, both axles of the truck being driven axles, the flanged wheels mounted thereon being provided with means permitting the wheels to move laterally of one of the axles and preventing rotary movement between the said axle and wheels.

Another object of the invention is to provide a means permitting relative movement between the rear end of the vehicle and the track whilst traversing curved portions of the track.

Figure 2:
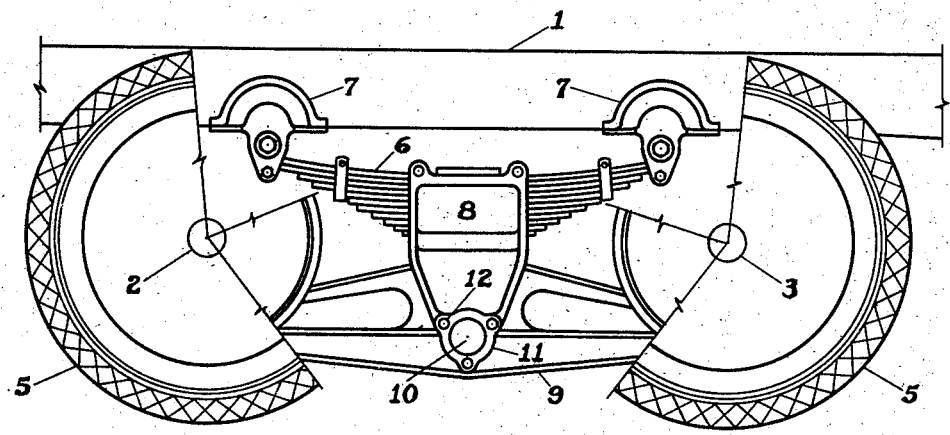
Figure 8:
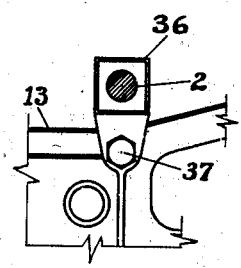

In the drawings forming part of this specification, Fig. 1 shows a plan view of the vehicle and trucks whilst traversing a curve in the track; Fig. 2 shows in elevation a portion of the rear end of the vehicle illustrating the method of connecting the standard road vehicle supporting wheels to the chassis; Fig. 3 is a plan view of the truck substituted for the supporting wheels when the chassis is used in a rail car; Fig. 4 shows in elevation the truck of Fig. 3; Figs. 5, 6 and 7 are enlarged details of sections through the truck of Fig. 3 taken on lines 6—6 and 7—7 of Fig. 3; Fig. 8 is an enlarged section taken on lines 8—8 of Fig. 3.

The invention herein described and the details of the specific embodiment of the invention are directed to the conversion of a road vehicle having two driving axles connected together by an equalizer beam attached to the usual spring suspension for the vehicle. It will be readily understood by those skilled in the art that the invention can be adapted to convert road vehicles which have a single driving axle by a slight change in the details used to illustrate the invention in the drawings, and therefore but one form of the invention will be shown with the understanding that the principles thereof can be readily adapted to both types of road vehicles.

In the drawings reference character 1 indicates a road vehicle chassis of the conventional design having a steering axle (not shown) beneath the front end of the vehicle and driving axles 2 and 3 mounted adjacent the rear end of the chassis 1. Such a chassis is regularly equipped with an adequate braking system including brake drums 4 mounted on the driving axles for retarding the wheels 5 of the motor chassis when used in road service. The usual springs 6 suspend the driving axles from the chassis 1 at each side of the vehicle and the springs are connected to the chassis 1 by means of suitably formed members 7. Spring saddles 8 pivotally connect the springs 6 with the equalizing beam 9 by means of the shafts 10 having the ends thereof enclosed by caps 11 secured to the saddle 8 by means of bolts 12. The equalizing beam has its opposite ends suitably connected to the driving axles 2 and 3.

The rear truck illustrated in Figs. 3 to 7 of the drawings comprises side members 13, which substitute for the equalizing beams 9, are preferably connected together by a member 14 passing through each side member 13 and its associated spring saddles 8 and substituting for the shafts 10. The truck side members 13 are preferably disposed outside the truck wheels and as the spacing of the truck side members at their connection to the spring saddles is limited by the spacing of the spring saddles on the chassis 1, the end portions of the truck side members are offset outwardly to support the truck wheels and axles. Adjacent each end of the truck side members 13 are transverse members 15 and 15ᵃ suitably connected to the members 13 as by gusset plates 16 to form a rigid truck frame. This truck frame is supported by wheeled axles mounted at opposite ends of the frame. The rear axle 17 is journaled in the frame members 13 by means of suitable bearings 18 secured to the frame members 13. The rear supporting wheels 19 of the truck are rigidly mounted on the axle 17 and the axle rotates in the bearings 18. In cases where the rear axle is a driven axle the axle is preferably extended beyond the bearings 18 and a sprocket wheel 20 is mounted on each extension. To provide for adjusting the sprocket chain 21 mounted on the sprocket 20 the bearing 18 is adjustably mounted in side frame member 13 and an adjusting screw 22 provided for movement of the bearing relative to the frame member.

The front axle 23 is rotatably mounted in the front ends of the frame members 13 by means of bearings 18 and provided with adjusting screws 22 as is the rear axle 17. The front axle 23 being also a driven axle is provided with extensions beyond the bearings 18, upon which extensions are mounted sprockets 20. For the purpose of permitting the wheel 24 of axle 23 to move relative to the truck whilst negotiating curved portions of the track and because of the necessity for the axle 23 to remain fixed in lateral relation to the chassis 1 and the driving axles 2 of the chassis, the wheels 24 are not rigidly connected to axle 23. The axle 23 has feather keys or splines 26 adjacent each end thereof between the frame members 13 and the wheel hubs 24ᵃ have keyways therein engaging said feather keys to permit movement of the wheel hub longitudinally of the axle and to cause the wheels to rotate with the axle 23 independently of said longitudinal movement.

Enclosing axle 23 is a sleeve 25 which spaces wheels 24 upon the axle and this sleeve is preferably secured to wheel hubs 24ᵃ by means of bolts 35. This sleeve serves to maintain a constant spacing of the wheels and to cause the pair of wheels on the axle to move as a unit relative to the axle 23. By directly connecting each wheel hub 24ᵃ to axle 23, torsional stresses in sleeve 25 are eliminated and a strong connection between each wheel hub and the axle is obtained.

To assist the sleeve 25 to return to a position bringing the wheels 24 in line with the wheels 19 whilst the rail car is traversing straight portions of the track, a guide lever 27 is pivotally mounted on the transverse member 15ᵃ by means of brackets 28 and pin 29. A split collar 30 is mounted on the sleeve 25 and a bushing 31 is provided between the collar 30 and sleeve 25 to permit relative rotation between the sleeve and collar. The collar 30 has oppositely disposed portions 32 projecting beyond the collar and engaging apertures 33 in the ends of the lever 27 which are spaced to embrace the collar 30. The apertures 32 are preferably elongated longitudinally of the lever 27 to accommodate slight relative movement between the collar and lever as the sleeve 25 moves laterally of the axle 23. Projecting laterally of the lever 27 is a member 34 having its end portions engaging tension springs 35. These springs 35 are mounted on the truck frame on opposite sides of the conection of lever 27 to the frame and serve to return the lever 27 and sleeve 25 to normal position when the vehicle moves onto a straight portion of the track.

When assembling the rear truck to the vehicle chassis 2, the road vehicle wheels and tires are removed from the axles 2 and 3 leaving the brakes and their operating mechanism undisturbed. The cap 11 and shafts 10 of the spring saddles 8 are removed and the equalizing beams 9 are discarded. The rear truck frame is then placed beneath the vehicle chassis, the side members 13 of the truck inserted in the spring saddles 8, and the member 14 inserted through both side frame members 13 and their associated spring saddles 8. Bearings 36 are mounted on the axles 2 and 3 of the chassis and are connected to the truck side members by pins 37. The sprocket wheels 20ᵃ are then mounted on the axles 2 and 3 using the same nuts to hold them in place as held the road vehicle wheels. Chains 21 are placed on the sprockets 20 to drive the truck axles 17 and 23 from the standard drive mechanism furnished with the chassis. It is to be understood the present invention does not contemplate disturbing any portion of the standard road vehicle driving mechanism except to substitute side frame members 13 for the equalizing beam 9 and to substitute sprockets 20 for the standard driving and supporting wheels.

Having thus described the invention what I claim as new and desire to secure by Letters Patent is:

1. In a rail vehicle of the character described, in combination, a chassis, a truck beneath the front end of the chassis and pivotally connected thereto, a non-pivoting truck beneath the rear end of the chassis, said non-pivoting truck having a wheeled front axle journaled on the truck, a sleeve mounted on said axle, wheels connected with said sleeve, and means connecting the axle and wheels providing lateral movement of the wheels upon the axle and positive rotary movement of the wheels with the axle.

2. In a rail car of the character described, in combination, a non-pivoting rear truck comprising side members, a pair of axles journaled in said side members, supporting wheels fixed relative to one of said axles, a sleeve mounted on the other of said axles for lateral movement relative to the axle, spaced axle supporting wheels mountd on said axle for rotary movement therewith and movement relative thereto laterally of the truck frame, a connection between the wheels and sleeve, a lever having its opposite ends pivotally connected with the sleeve and the truck respectively, and resilient means resisting relative pivotal movement between the lever and truck.

3. In a rail car of the character described, in combination, a non-pivoting rear truck comprising side members, an axle journaled on said side members for rotary movement, a sleeve on said axle in spaced relation to said side members, said sleeve rotating with the said axle and slidable thereon, a collar rotatably mounted on said sleeve intermediate the ends thereof, guide means connected to said collar and truck for normally retaining said sleeve intermediate said truck side members, and truck supporting wheels keyed to the shaft and attached to said sleeve adjacent each end thereof.

4. The combination in a rail vehicle of a vehicle frame, a truck frame disposed beneath one end of the vehicle frame, side members on the truck frame having their end portions disposed outwardly of the intermediate portions of the side members, a connection between the intermediate portions of each truck side member and the vehicle frame, a driving axle mounted on the intermediate portions of the truck side members and actuating means for said axle on the vehicle frame, truck frame supporting axles mounted between said end portions of the truck frame side members and connected thereto, wheels mounted on said latter axles for simultaneous rotation therewith, a sprocket and chain drive between one of said truck supporting axles and said driving axle, feather key connections between the wheels and one truck supporting axle providing relative movement laterally of the truck frame between the axle and wheels and means connecting said latter wheels providing fixed spaced relation between the wheels in all positions on the axle.

5. In a rail vehicle in combination, a vehicle frame, a truck frame disposed beneath one end of the vehicle frame, a connection between said frames providing relative vertical and pivotal movement longitudinally of the vehicle frame, axles journaled at opposite ends on the truck frame for rotary movement only relative to the frame, wheels mounted on one of said axles for unitary rotation therewith and relative movement transversely of the frame, a member pivoted on said truck frame and overlying one of said axles, means connecting the wheels of said axle and said member for relative rotary movement between the said means and said member, and resilient members connecting opposite sides of said pivoted member to the truck frame for resisting lateral displacement of said wheels from normal position.

6. In a rail vehicle in combination, a vehicle underframe, a truck frame beneath one end of the underframe, a connection between the truck frame and underframe preventing relative movement therebetween transversely of the underframe, an axle adjacent each end of the truck frame and journaled on the truck frame for rotary movement only relative to the frame, a pair of wheels rigidly mounted on one of said axles, a pair of wheels mounted on the other of said axles for positive rotary movement therewith and movable transversely of the truck frame to accommodate the truck frame to curvatures of the rails on which the vehicle moves.

7. In a rail vehicle truck frame, in combination, an axle supported on the frame for rotary movement only, a pair of wheels on the axle and movable laterally of the truck frame, feather keys connecting said axle and wheels for simultaneous rotary motion, and means maintaining said wheels in fixed spaced relation on said axle.

8. In a rail vehicle truck the combination of a truck frame, an axle mounted on the frame for rotary motion only relative to the frame, wheels mounted directly on said axle and engaging the rails on which the vehicle moves, said wheels rotating with the axle and movable on the axle laterally of the truck frame, and means connecting said wheels maintaining same in fixed spaced relation on the axle.

9. The combination in a rail vehicle of a vehicle underframe, a truck frame disposed beneath one end of the underframe, a driving axle mounted on the truck frame, actuating means on the underframe for said driven axle, an axle mounted on said truck frame for rotary movement only relative to said truck frame, a chain and sprocket drive connecting said axles, a sleeve on said truck frame axle and movable longitudinally of said axle, a pair of wheels rigidly associated with said sleeve, and means directly connecting the said wheels and associated axle for simultaneous rotary movement.

ALFRED C. SCHMOHL.